(12) United States Patent
Boucher et al.

(10) Patent No.: US 7,461,160 B2
(45) Date of Patent: Dec. 2, 2008

(54) OBTAINING A DESTINATION ADDRESS SO THAT A NETWORK INTERFACE DEVICE CAN WRITE NETWORK DATA WITHOUT HEADERS DIRECTLY INTO HOST MEMORY

(75) Inventors: Laurence B. Boucher, Saratoga, CA (US); Stephen E. J. Blightman, San Jose, CA (US); Peter K. Craft, San Francisco, CA (US); David A. Higgen, Saratoga, CA (US); Clive M. Philbrick, San Jose, CA (US); Daryl D. Starr, Milpitas, CA (US)

(73) Assignee: Alacritech, Inc., San Jose, CA (US)

( * ) Notice: Subject to any disclaimer, the term of this patent is extended or adjusted under 35 U.S.C. 154(b) by 931 days.

(21) Appl. No.: 10/881,271

(22) Filed: Jun. 29, 2004

(65) Prior Publication Data
US 2004/0240435 A1    Dec. 2, 2004

Related U.S. Application Data

(63) Continuation of application No. 09/789,366, filed on Feb. 20, 2001, now Pat. No. 6,757,746, which is a continuation-in-part of application No. 09/464,283, filed on Dec. 15, 1999, now Pat. No. 6,427,173, which is a continuation of application No. 09/439,603, filed on Nov. 12, 1999, now Pat. No. 6,247,060, which is a continuation of application No. 09/067,544, filed on Apr. 27, 1998, now Pat. No. 6,226,680, said application No. 09/789,366 and a continuation-in-part of application No. 09/748,936, filed on Dec. 26, 2000, now Pat. No. 6,334,153, and a continuation-in-part of application No. 09/692,561, filed on Oct. 18, 2000, and a continuation-in-part of application No. 09/675,700, filed on Sep. 29, 2000, and a continuation-in-part of application No. 09/675,484, filed on Sep. 29, 2000, now Pat. No. 6,807,581, and a continuation-in-part of application No. 09/514,425, filed on Feb. 28, 2000, now Pat. No. 6,427,171, and a continuation-in-part of application No. 09/416,925, filed on Oct. 13, 1999, now Pat. No. 6,470,415, and a continuation-in-part of application No. 09/141,713, filed on Aug. 28, 1998, now Pat. No. 6,389,479, , said application No. 09/789, 366 is a continuation-in-part of application No. 09/384,792, filed on Aug. 27, 1999, now Pat. No. 6,434,620.

(60) Provisional application No. 60/098,296, filed on Aug. 27, 1998, provisional application No. 60/061,809, filed on Oct. 14, 1997.

(51) Int. Cl.
*G06F 15/16* (2006.01)
*G06F 12/00* (2006.01)

(52) U.S. Cl. ..................................... 709/230; 709/250

(58) Field of Classification Search ................. 709/250, 709/230, 231, 228, 243, 236, 225, 245
See application file for complete search history.

(56) References Cited

U.S. PATENT DOCUMENTS 4,366,538 A    12/1982   Johnson et al. ............. 364/200
(Continued)

FOREIGN PATENT DOCUMENTS

WO    WO 98/50852    11/1998
(Continued)

OTHER PUBLICATIONS

Schwaderer et al., IEEE Computer Society Press publication entitled, "XTP in VLSI Protocol Decomposition for ASIC Implementation", from 15th Conference on Local Computer Networks, 5 pages, Sep. 30-Oct. 3, 1990.
(Continued)

*Primary Examiner*—Zarni Maung
(74) *Attorney, Agent, or Firm*—Mark Lauer; Silicon Edge Law Group LLP

(57) ABSTRACT

A Network Interface device (NI device) coupled to a host computer receives a multi-packet message from a network (for example, the Internet) and DMAs the data portions of the various packets directly into a destination in application memory on the host computer. The address of the destination is determined by supplying a first part of the first packet to an application program such that the application program returns the address of the destination. The address is supplied by the host computer to the NI device so that the NI device can DMA the data portions of the various packets directly into the destination. In some embodiments the NI device is an expansion card added to the host computer, whereas in other embodiments the NI device is a part of the host computer.

14 Claims, 3 Drawing Sheets

U.S. PATENT DOCUMENTS

| | | | |
|---|---|---|---|
| 4,485,455 A | 11/1984 | Boone et al. | 364/900 |
| 4,485,460 A | 11/1984 | Stambaugh | 365/203 |
| 4,589,063 A | 5/1986 | Shah et al. | 710/8 |
| 4,700,185 A | 10/1987 | Balph et al. | 340/825.5 |
| 4,991,133 A | 2/1991 | Davis et al. | 364/900 |
| 5,056,058 A | 10/1991 | Hirata et al. | 364/900 |
| 5,058,110 A | 10/1991 | Beach et al. | 370/85.6 |
| 5,097,442 A | 3/1992 | Ward et al. | 365/78 |
| 5,163,131 A | 11/1992 | Row et al. | 395/200 |
| 5,212,778 A | 5/1993 | Dally et al. | 395/400 |
| 5,280,477 A | 1/1994 | Trapp | 370/85.1 |
| 5,289,580 A | 2/1994 | Latif et al. | 395/275 |
| 5,303,344 A | 4/1994 | Yokoyama et al. | 395/200 |
| 5,412,782 A | 5/1995 | Hausman et al. | 395/250 |
| 5,418,912 A | 5/1995 | Christenson | 395/200 |
| 5,448,566 A | 9/1995 | Richter et al. | 370/94.1 |
| 5,485,579 A | 1/1996 | Hitz et al. | 395/200.12 |
| 5,506,966 A | 4/1996 | Ban | 395/250 |
| 5,511,169 A | 4/1996 | Suda | 395/280 |
| 5,517,668 A | 5/1996 | Szwerinski et al. | 395/800 |
| 5,524,250 A | 6/1996 | Chesson et al. | 395/775 |
| 5,535,375 A | 7/1996 | Eshel et al. | 391/500 |
| 5,548,730 A | 8/1996 | Young et al. | 395/280 |
| 5,566,170 A | 10/1996 | Bakke et al. | 370/60 |
| 5,574,919 A | 11/1996 | Netravali et al. | 395/561 |
| 5,588,121 A | 12/1996 | Reddin et al. | 395/200.15 |
| 5,590,328 A | 12/1996 | Seno et al. | 395/675 |
| 5,592,622 A | 1/1997 | Isfeld et al. | 395/200.02 |
| 5,598,410 A | 1/1997 | Stone | 370/469 |
| 5,619,650 A | 4/1997 | Bach et al. | 395/200.01 |
| 5,629,933 A | 5/1997 | Delp et al. | 370/411 |
| 5,633,780 A | 5/1997 | Cronin et al. | 361/220 |
| 5,634,099 A | 5/1997 | Andrews et al. | 395/200.07 |
| 5,634,127 A | 5/1997 | Cloud et al. | 395/680 |
| 5,642,482 A | 6/1997 | Pardillos | 395/200.2 |
| 5,664,114 A | 9/1997 | Krech, Jr. et al. | 395/200.64 |
| 5,671,355 A | 9/1997 | Collins | 395/200.2 |
| 5,678,060 A | 10/1997 | Yokoyama et al. | 709/212 |
| 5,682,534 A | 10/1997 | Kapoor et al. | 395/684 |
| 5,692,130 A | 11/1997 | Shobu et al. | 395/200.12 |
| 5,699,317 A | 12/1997 | Sartore et al. | 395/230.06 |
| 5,699,350 A | 12/1997 | Kraslavsky | 370/254 |
| 5,701,434 A | 12/1997 | Nakagawa | 395/484 |
| 5,701,516 A | 12/1997 | Cheng et al. | 395/842 |
| 5,727,142 A | 3/1998 | Chen | 395/181 |
| 5,742,765 A | 4/1998 | Wong et al. | 395/200 |
| 5,749,095 A | 5/1998 | Hagersten | 711/141 |
| 5,751,715 A | 5/1998 | Chan et al. | 370/455 |
| 5,752,078 A | 5/1998 | Delp et al. | 395/827 |
| 5,758,084 A | 5/1998 | Silverstein et al. | 395/200.58 |
| 5,758,089 A | 5/1998 | Gentry et al. | 395/200.64 |
| 5,758,186 A | 5/1998 | Hamilton et al. | 395/831 |
| 5,758,194 A | 5/1998 | Kuzma | 395/886 |
| 5,768,618 A | 6/1998 | Erickson et al. | 395/829 |
| 5,771,349 A | 6/1998 | Picazo, Jr. et al. | 395/188.01 |
| 5,774,660 A | 6/1998 | Brendel et al. | 395/200.31 |
| 5,778,013 A | 7/1998 | Jedwab | 714/807 |
| 5,778,419 A | 7/1998 | Hansen et al. | 711/112 |
| 5,790,804 A | 8/1998 | Osborne | 709/245 |
| 5,794,061 A | 8/1998 | Hansen et al. | 395/800.01 |
| 5,802,258 A | 9/1998 | Chen | 395/182.08 |
| 5,802,580 A | 9/1998 | McAlpice | 711/149 |
| 5,809,328 A | 9/1998 | Nogales et al. | 395/825 |
| 5,809,527 A | 9/1998 | Cooper et al. | 711/133 |
| 5,812,775 A | 9/1998 | Van Seeters et al. | 395/200.43 |
| 5,815,646 A | 9/1998 | Purcell et al. | 395/163 |
| 5,828,835 A | 10/1998 | Isfeld et al. | 395/200.3 |
| 5,848,293 A | 12/1998 | Gentry et al. | 395/825 |
| 5,872,919 A | 2/1999 | Wakeland et al. | 395/200 |
| 5,878,225 A | 3/1999 | Bilansky et al. | 395/200.57 |
| 5,892,903 A | 4/1999 | Klaus | 395/187.01 |
| 5,898,713 A | 4/1999 | Melzer et al. | 371/53 |
| 5,913,028 A | 6/1999 | Wang et al. | 395/200.33 |
| 5,920,566 A | 7/1999 | Hendel et al. | 370/401 |
| 5,930,830 A | 7/1999 | Mendelson et al. | 711/171 |
| 5,931,918 A | 8/1999 | Row et al. | 709/300 |
| 5,935,205 A | 8/1999 | Murayama et al. | 709/216 |
| 5,937,169 A | 8/1999 | Connery et al. | 395/200.8 |
| 5,941,969 A | 8/1999 | Ram et al. | 710/128 |
| 5,941,972 A | 8/1999 | Hoese et al. | 710/129 |
| 5,950,203 A | 9/1999 | Stakuis et al. | 707/10 |
| 5,987,022 A | 11/1999 | Geiger et al. | 370/349 |
| 5,991,299 A | 11/1999 | Radogna et al. | 370/392 |
| 5,996,013 A | 11/1999 | Delp et al. | 709/226 |
| 5,996,024 A | 11/1999 | Blumenau | 709/301 |
| 6,005,849 A | 12/1999 | Roach et al. | 370/276 |
| 6,009,478 A | 12/1999 | Panner et al. | 710/5 |
| 6,016,513 A | 1/2000 | Lowe | 709/250 |
| 6,021,446 A | 2/2000 | Gentry et al. | 709/303 |
| 6,021,507 A | 2/2000 | Chen | 714/2 |
| 6,026,452 A | 2/2000 | Pitts | 710/56 |
| 6,034,963 A | 3/2000 | Minami et al. | 370/401 |
| 6,038,562 A | 3/2000 | Anjur et al. | 707/10 |
| 6,041,058 A | 3/2000 | Flanders et al. | 370/401 |
| 6,041,381 A | 3/2000 | Hoese | 710/129 |
| 6,044,438 A | 3/2000 | Olnowich | 711/130 |
| 6,047,323 A | 4/2000 | Krause | 709/227 |
| 6,047,356 A | 4/2000 | Anderson et al. | 711/129 |
| 6,049,528 A | 4/2000 | Hendel et al. | 370/235 |
| 6,057,863 A | 5/2000 | Olarig | 345/520 |
| 6,061,368 A | 5/2000 | Hitzelberger | 370/537 |
| 6,065,096 A | 5/2000 | Day et al. | 711/114 |
| 6,067,569 A | 5/2000 | Khaki et al. | 709/224 |
| 6,070,200 A | 5/2000 | Gates et al. | 710/20 |
| 6,078,733 A | 6/2000 | Osborne | 395/200.8 |
| 6,097,734 A | 8/2000 | Gotesman et al. | 370/474 |
| 6,101,555 A | 8/2000 | Goshey et al. | 709/321 |
| 6,111,673 A | 8/2000 | Chang et al. | 398/79 |
| 6,115,615 A | 9/2000 | Ota et al. | 455/553 |
| 6,122,670 A | 9/2000 | Bennett et al. | 709/236 |
| 6,141,701 A | 10/2000 | Whitney | 710/5 |
| 6,141,705 A | 10/2000 | Anand et al. | 710/15 |
| 6,145,017 A | 11/2000 | Ghaffari | 710/5 |
| 6,157,955 A | 12/2000 | Narad et al. | 709/228 |
| 6,172,980 B1 | 1/2001 | Flanders et al. | 370/401 |
| 6,173,333 B1 | 1/2001 | Jolitz et al. | |
| 6,202,105 B1 | 3/2001 | Gates et al. | 710/20 |
| 6,223,242 B1 | 4/2001 | Sheafor et al. | 710/132 |
| 6,226,680 B1 | 5/2001 | Boucher et al. | 709/230 |
| 6,246,683 B1 | 6/2001 | Connery et al. | 370/392 |
| 6,247,060 B1 | 6/2001 | Boucher et al. | 709/238 |
| 6,279,051 B1 | 8/2001 | Gates et al. | 710/20 |
| 6,289,023 B1 | 9/2001 | Dowling et al. | 370/419 |
| 6,298,403 B1 | 10/2001 | Suri et al. | 710/100 |
| 6,324,649 B1 | 11/2001 | Eyres et al. | 713/202 |
| 6,334,153 B2 | 12/2001 | Boucher et al. | 709/230 |
| 6,343,360 B1 | 1/2002 | Feinleib | 713/1 |
| 6,345,301 B1 | 2/2002 | Burns et al. | 709/230 |
| 6,345,302 B1 | 2/2002 | Bennett et al. | 709/236 |
| 6,356,951 B1 | 3/2002 | Gentry et al. | 709/250 |
| 6,370,599 B1 | 4/2002 | Anand et al. | 710/15 |
| 6,385,647 B1 | 5/2002 | Willis et al. | 709/217 |
| 6,389,468 B1 | 5/2002 | Muller et al. | 709/226 |
| 6,389,479 B1 | 5/2002 | Boucher | 709/243 |
| 6,393,487 B2 | 5/2002 | Boucher et al. | 709/238 |
| 6,421,742 B1 | 7/2002 | Tillier | 710/1 |
| 6,421,753 B1 | 7/2002 | Hoese et al. | 710/129 |
| 6,427,169 B1 | 7/2002 | Elzur | 709/224 |
| 6,427,171 B1 | 7/2002 | Craft et al. | 709/230 |
| 6,427,173 B1 | 7/2002 | Boucher et al. | 709/238 |
| 6,434,620 B1 | 8/2002 | Boucher et al. | 709/230 |
| 6,434,651 B1 | 8/2002 | Gentry, Jr. | 710/260 |
| 6,449,656 B1 | 9/2002 | Elzur et al. | 709/236 |
| 6,453,360 B1 | 9/2002 | Muller et al. | 709/250 |

| | | | | |
|---|---|---|---|---|
| 6,470,415 B1 | 10/2002 | Starr et al. | | 711/104 |
| 6,473,425 B1 | 10/2002 | Bellaton et al. | | 370/392 |
| 6,480,489 B1 | 11/2002 | Muller et al. | | 370/389 |
| 6,487,202 B1 | 11/2002 | Klausmeier et al. | | 370/395 |
| 6,487,654 B2 | 11/2002 | Dowling | | 712/244 |
| 6,490,631 B1 | 12/2002 | Teich et al. | | 709/250 |
| 6,502,144 B1 | 12/2002 | Accarie | | 710/8 |
| 6,523,119 B2 | 2/2003 | Pavlin et al. | | 713/192 |
| 6,526,446 B1 | 2/2003 | Yang et al. | | 709/230 |
| 6,570,884 B1 | 5/2003 | Connery et al. | | 370/471 |
| 6,591,302 B2 | 7/2003 | Boucher et al. | | 709/230 |
| 6,591,310 B1 | 7/2003 | Johnson | | 710/3 |
| 6,648,611 B2 | 11/2003 | Morse et al. | | 417/310 |
| 6,650,640 B1 | 11/2003 | Muller et al. | | 370/392 |
| 6,657,757 B1 | 12/2003 | Chang et al. | | 370/471 |
| 6,658,480 B2 | 12/2003 | Boucher et al. | | 709/239 |
| 6,678,283 B1 | 1/2004 | Teplitsky | | 370/463 |
| 6,681,364 B1 | 1/2004 | Calvignac et al. | | 714/776 |
| 6,687,758 B2 | 2/2004 | Craft et al. | | 709/250 |
| 6,697,366 B1 | 2/2004 | Kim | | 370/392 |
| 6,697,868 B2 | 2/2004 | Craft et al. | | 709/230 |
| 6,751,665 B2 | 6/2004 | Philbrick et al. | | 709/224 |
| 6,757,746 B2 * | 6/2004 | Boucher et al. | | 709/250 |
| 6,765,901 B1 | 7/2004 | Johnson et al. | | 370/352 |
| 6,807,581 B1 | 10/2004 | Starr et al. | | 709/250 |
| 6,842,896 B1 | 1/2005 | Redding et al. | | 717/172 |
| 6,912,522 B2 | 6/2005 | Edgar | | 707/2 |
| 6,937,598 B1 * | 8/2005 | Hagirahim et al. | | 370/356 |
| 6,938,092 B2 | 8/2005 | Burns | | 709/230 |
| 6,941,386 B2 | 9/2005 | Craft et al. | | 709/250 |
| 6,965,941 B2 | 11/2005 | Boucher et al. | | 709/230 |
| 6,996,070 B2 | 2/2006 | Starr et al. | | 370/252 |
| 7,042,898 B2 | 5/2006 | Blightman et al. | | 370/463 |
| 7,076,568 B2 | 7/2006 | Philbrick et al. | | 709/250 |
| 7,089,326 B2 | 8/2006 | Boucher et al. | | 709/242 |
| 7,093,099 B2 | 8/2006 | Bodas et al. | | 711/206 |
| 7,124,205 B2 | 10/2006 | Craft et al. | | 709/250 |
| 7,133,940 B2 | 11/2006 | Blightman et al. | | 710/22 |
| 7,167,926 B1 | 1/2007 | Boucher et al. | | 709/250 |
| 7,167,927 B2 | 1/2007 | Philbrick et al. | | 709/250 |
| 7,174,393 B2 | 2/2007 | Boucher et al. | | 709/250 |
| 7,185,266 B2 | 2/2007 | Blightman et al. | | 714/776 |
| 7,191,241 B2 | 3/2007 | Boucher et al. | | 709/230 |
| 7,191,318 B2 | 3/2007 | Tripathy et al. | | 712/225 |
| 7,237,036 B2 | 6/2007 | Boucher et al. | | 709/245 |
| 7,254,696 B2 | 8/2007 | Mittal et al. | | 712/210 |
| 7,284,070 B2 | 10/2007 | Boucher et al. | | 709/250 |
| 2001/0025315 A | 1/2001 | Jolitz | | |
| 2001/0004354 A1 | 6/2001 | Jolitz | | |
| 2001/0013059 A1 | 8/2001 | Dawson et al. | | |
| 2001/0014892 A1 | 8/2001 | Gaither et al. | | |
| 2001/0014954 A1 | 8/2001 | Purcell et al. | | |
| 2001/0048681 A1 | 12/2001 | Bilic et al. | | |
| 2001/0053148 A1 | 12/2001 | Bilic et al. | | |
| 2002/0073223 A1 | 6/2002 | Darnell et al. | | 709/232 |
| 2002/0112175 A1 | 8/2002 | Makofka et al. | | 713/200 |
| 2003/0066011 A1 | 4/2003 | Oren | | |
| 2003/0110344 A1 | 6/2003 | Szezepanek et al. | | 711/100 |
| 2003/0165160 A1 | 9/2003 | Minami et al. | | |
| 2004/0054814 A1 | 3/2004 | McDaniel | | |
| 2004/0059926 A1 | 3/2004 | Angelo et al. | | 713/168 |
| 2004/0153578 A1 | 8/2004 | Elzur | | |
| 2004/0213290 A1 | 10/2004 | Johnson et al. | | 370/469 |
| 2004/0246974 A1 | 12/2004 | Gyugyi et al. | | 370/395.31 |

FOREIGN PATENT DOCUMENTS

| | | |
|---|---|---|
| WO | WO 99/04343 | 1/1999 |
| WO | WO 99/65219 | 12/1999 |
| WO | WO 00/13091 | 3/2000 |
| WO | WO 01/04770 | 1/2001 |
| WO | WO 01/05107 | 1/2001 |
| WO | WO 01/05116 | 1/2001 |
| WO | WO 01/05123 | 1/2001 |
| WO | WO 01/40960 | 6/2001 |
| WO | WO 01/59966 | 8/2001 |
| WO | WO 01/86430 | 11/2001 |

OTHER PUBLICATIONS

Beach, Bob, IEEE Computer Society Press publication entitled, "UltraNet: An Architecture for Gigabit Networking", from 15th Conference on Local Computer Networks, 18 pages, Sep. 30-Oct. 3, 1990.

Chesson et al., IEEE Syposium Record entitled, "The Protocol Engine Chipset", from Hot Chips III, 16 pages, Aug. 26-27, 1991.

Maclean et al., IEEE Global Telecommunications Conference, Globecom '91, presentation entitled, "An Outboard Processor for High Performance Implementation of Transport Layer Protocols", 7 pages, Dec. 2-5, 1991.

Ross et al., IEEE article entitled "FX1000: A high performance single chip Gigabit Ethernet NIC", from Compcon '97 Proceedings, 7 pages, Feb. 23-26, 1997.

Strayer et al., "Ch. 9: The Protocol Engine" from XTP: The Transfer Protocol, 12 pages, Jul. 1992.

Publication entitled "Protocol Engine Handbook", 44 pages, Oct. 1990.

Koufopavlou et al., IEEE Global Telecommunications Conference, Globecom '92, presentation entitled, "Parallel TCP for High Performance Communication Subsystems", 7 pages, Dec. 6-9, 1992.

Lilienkamp et al., Publication entitled "Proposed Host-Front End Protocol", 56 pages, Dec. 1984.

Form 10-K for Exelan, Inc., for the fiscal year ending Dec. 31, 1987 (10 pages).

Form 10-K for Exelan, Inc., for the fiscal year ending Dec. 31, 1988 (10 pages).

Internet pages entitled "Hardware Assisted Protocol Processing", (which Eugene Feinber is working on), 1 page, printed Nov. 25, 1998.

Zilog product Brief entitled "Z85C30 CMOS SCC Serial Communication Controller", Zilog Inc., 3 pages, 1997.

Internet pages of Xpoint Technologies, Inc. entitled "Smart LAN Work Requests", 5 pages, printed Dec. 19, 1997.

Internet pages entitled: Asante and 100BASE-T Fast Ethernet. 7 pages, printed May 27, 1997.

Internet pages entitled: A Guide to the Paragon XP/S-A7 Supercomputer at Indiana University. 13 pages, printed Dec. 21, 1998.

Richard Stevens, "TCP/IP Illustrated, vol. 1, The Protocols", pp. 325-326 (1994).

Internet pages entitled: Northridge/Southbridge vs. Intel Hub Architecture, 4 pages, printed Feb. 19, 2001.

Gigabit Ethernet Technical Brief, Achieving End-to-End Performance. Alteon Networks, Inc., First Edition, Sep. 1996, 15 pages.

Internet pages directed to Technical Brief on Alteon Ethernet Gigabit NIC technology, www.alteon.com, 14 pages, printed Mar. 15, 1997.

VIA Technologies, Inc. article entitled "VT8501 Apollo MVP4", pp. i-iv, 1-11, cover and copyright page, revision 1.3, Feb. 1, 2000.

iReady News Archives article entitled "iReady Rounding Out Management Team with Two Key Executives", http://www.ireadyco.com/archives/keyexec.html, 2 pages, printed Nov. 28, 1998.

"Toshiba Delivers First Chips to Make Consumer Devices Internet-Ready Based On iReady's Design," Press Release Oct. 1998, 3 pages, printed Nov. 28, 1998.

Internet pages from iReady Products, web sitehttp://www.ireadyco.com/products,html, 2 pages, downloaded Nov. 25, 1998.

iReady News Archives, Toshiba, iReady shipping Internet chip, 1 page, printed Nov. 25, 1998.

Interprophet article entitled "Technology", http://www.interprophet.com/technology.html, 17 pages, printed Mar. 1, 2000.

iReady Corporation, article entitled "The I-1000 Internet Tuner", 2 pages, date unknown.

iReady article entitled "About Us Introduction", Internet pages fromhttp://www.iReadyco.com/about.html, 3 pages, printed Nov. 25, 1998.

iReady News Archive article entitled "Revolutionary Approach to Consumer Electronics Internet Connectivity Funded", San Jose, CA, Nov. 20, 1997. 2 pages, printed Nov. 2, 1998.

iReady News Archive article entitled "Seiko Instruments Inc. (SII) Introduces World's First Internet-Ready Intelligent LCD Modules Based on iReady Technology," Santa Clara, CA and Chiba, Japan, Oct. 26, 1998. 2 pages, printed Nov. 2, 1998.

NEWSwatch article entitled "iReady internet Tuner to Web Enable Devices", Tuesday, Nov. 5, 1996, printed Nov. 2, 1998, 2 pages.

EETimes article entitled "Tuner for Toshiba, Toshiba Taps iReady for Internet Tuner", by David Lammers, 2 pages, printed Nov. 2, 1998.

"Comparison of Novell Netware and TCP/IP Protocol Architectures", by J.S. Carbone, 19 pages, printed Apr. 10, 1998.

Adaptec article entitled "AEA-7110C-a DuraSAN product", 11 pages, printed Oct. 1, 2001.

iSCSI HBA article entitled "iSCSI and 2Gigabit fibre Channel Host Bus Adapters from Emulex, QLogic, Adaptec, JNI", 8 pages, printed Oct. 1, 2001.

iSCSI HBA article entitled "FCE-3210/6410 32 and 64-bit PCI-to-Fibre Channel HBA", 6 pages, printed Oct. 1, 2001.

ISCSI.com article entitled "iSCSI Storage", 2 pages, printed Oct. 1, 2001.

"Two-Way TCP Traffic Over Rate Controlled Channels: Effects and Analysis", by Kalampoukas et al., IEEE Transactions on Networking, vol. 6, No. 6, Dec. 1998, 17 pages.

IReady News article entitled "Toshiba Delivers First Chips to Make Consumer Devices Internet-Ready Based on iReady Design", Santa Clara, CA, and Tokyo, Japan, Oct. 14, 1998, printed Nov. 2, 1998, 3 pages.

Internet pages of InterProphet entitled "Frequently Asked Questions", by Lynne Jolitz, printed Jun. 14, 2000, 4 pages.

"File System Design For An NFS File Server Appliance", Article by D. Hitz, et al., 13 pages.

Adaptec Press Release article entitled "Adaptec Announces EtherStorage Technology", 2 pages, May 4, 2000, printed Jun. 14, 2000.

Adaptec article entitled "EtherStorage Frequently Asked Questions", 5 pages, printed Jul. 19, 2000.

Adaptec article entitled "EtherStorage White Paper", 7 pages, printed Jul. 19, 2000.

CIBC World Markets article entitled "Computers; Storage", by J. Berlino et al., 9 pages, dated Aug. 7, 2000.

Merrill Lynch article entitled "Storage Futures", by S. Milunovich, 22 pages, dated May 10, 2000.

CBS Market Watch article entitled "Montreal Start-Up Battles Data Storage Botttleneck", by S. Taylor, dated Mar. 5, 2000, 2 pages, printed Mar. 7, 2000.

Internet-draft article entitled "SCSI/TCP (SCSI over TCP)", by J. Satran et al., 38 pages, dated Feb. 2000, printed May 19, 2000.

Internet pages entitled Technical White Paper-Xpoint's Disk to LAN Acceleration Solution for Windows NT Server, printed Jun. 5, 1997, 15 pages.

Jato Technologies article entitled Network Accelerator Chip Architecture, twelve-slide presentation, printed Aug. 19, 1998, 13 pages.

EETimes article entitled Enterprise System Used Flexible Spec, dated Aug. 10, 1998, printed Nov. 25, 1998, 3 pages.

Internet pages entitled "Smart Ethernet Network Interface Cards", which Berend Ozceri is developing, printed Nov. 25, 1998, 2 pages.

Internet pages of Xaqti corporation entitled "Giga Power Protocol Processor Product Review," printed Nov. 25, 1999, 4 pages.

Internet pages entitled "DART: Fast Application Level Networking via Data-Copy Avoidance," by Robert J. Walsh, printed Jun. 3, 1999, 25 pages.

U.S. Appl. No. 60/053,240, filed Jul. 18, 1997, Jolitz et al.

Andrew Tanenbaum, "Computer Networks", Third Edition, ISBN 0-13-349945-6, entire book (1996).

Article from Rice University entitled "LRP: A New Network Subsystem Architecture for Server Systems", by Peter Druschel and Gaurav Banga, 14 pages.

Internet RFC/STD/FYI/BCP Archives article with heading "RFC2140" entitled "TCP Control Block Interdependence", web address http://www.faqs.org/rfcs/rfc2140.html, 9 pages, printed Sep. 20, 2002.

WindRiver article entitled "Tornado: For Intelligent Network Acceleration", copyright Wind River Systems, 2001, 2 pages.

WindRiver White Paper entitled "Complete TCP/IP Offload for High-Speed Ethernet Networks", Copyright Wind River Systems, 2002, 7 pages.

Intel article entitled "Solving Server Bottlenecks with Intel Server Adapters", Copyright Intel Corporation, 1999, 8 pages.

Thia et al. Publication entitled "High-Speed OSI Protocol Bypass Algorithm with Window Flow Control," Protocols for High Speed Networks, pp. 53-68, 1993.

U.S. Appl. No. 60/053,240, Titled: TCP/IP Network Accelerator and Method of Use, filed Jul. 17, 1997, Inventor: William Jolitz et al.

Thia et al. Publication entitled "A Reduced Operational Protocol Engine (ROPE) for a multiple-layer bypass architecture," Protocols for High Speed Networks, pp. 224-239, 1995.

* cited by examiner

OBTAINING A DESTINATION ADDRESS SO THAT A NETWORK INTERFACE DEVICE CAN WRITE NETWORK DATA WITHOUT HEADERS DIRECTLY INTO HOST MEMORY

CROSS-REFERENCE TO RELATED APPLICATIONS

This application is a continuation of and claims the benefit under 35 U.S.C. §120 of prior U.S. patent application Ser. No. 09/789,366, filed Feb. 20, 2001, now U.S. Pat. No. 6,757,746.

Prior U.S. patent application Ser. No. 09/789,366, now U.S. Pat. No. 6,757,746, is a continuation-in-part of and claims the benefit under 35 U.S.C. § 120 of U.S. patent application Ser. No. 09/464,283, filed Dec. 15, 1999, now U.S. Pat. No. 6,427,173, which in turn claims the benefit under 35 U.S.C. § 120 of U.S. patent application Ser. No. 09/439,603, filed Nov. 12, 1999, now U.S. Pat. No. 6,247,060, which in turn claims the benefit under 35 U.S.C. §. 120 of U.S. patent application Ser. No. 09/067,544, filed Apr. 27, 1998, now U.S. Pat. No. 6,226,680, which in turn claims the benefit under 35 U.S.C. § 119(e) of the Provisional Application Ser. No. 60/061,809, filed Oct. 14, 1997.

Prior U.S. patent application Ser. No. 09/789,366, now U.S. Pat. No. 6,757,746, also is a continuation-in-part and claims benefit under 35 U.S.C. § 120 of the following U.S. patent applications: Ser. No. 09/748,936, filed Dec. 26, 2000, now U.S. Pat. No. 6,334,153; Ser. No. 09/692,561, filed Oct. 18, 2000; Ser. No. 09/675,700, filed Sep. 29, 2000; Ser. No. 09/675,484, filed Sep. 29, 2000; Ser. No. 09/514,425, filed Feb. 28, 2000, now U.S. Pat. No. 6,427,171; Ser. No. 09/416,925, filed Oct. 13, 1999, now U.S. Pat. No. 6,470,415; and Ser. No. 09/141,713, filed Aug. 28, 1998, now U.S. Pat. No. 6,389,479.

Prior U.S. patent application Ser. No. 09/789,366, now U.S. Pat. No. 6,757,746, is also a continuation-in-part of and claims benefit under 35 U.S.C. § 120 of U.S. patent application Ser. No. 09/384,792, filed Aug. 27, 1999, now U.S. Pat. No. 6,434,620, which in turn claims the benefit under 35 U.S.C. § 119 of Provisional Application Ser. No. 60/098,296, filed Aug. 27, 1998.

The complete disclosures of: U.S. patent application Ser. Nos. 09/789,366; 09/464,283; 09/439,603; 09/067,544; 09/748,936; 09/692,561; 09/675,700; 09/675,484; 09/514,425; 09/416,925; 09/384,792; 09/141,713 and Provisional Application Ser. Nos. 60/061,809 and 60/098,296 are incorporated herein by reference.

TECHNICAL FIELD

The present invention relates generally to computer or other networks, and more particularly to protocol processing for information communicated between hosts such as computers connected to a network.

BACKGROUND INFORMATION

One of the most CPU intensive activities associated with performing network protocol processing is the need to copy incoming network data from an initial landing point in system memory to a final destination in application memory. This copying is necessary because received network data cannot generally be moved to the final destination until the associated packets are: A) analyzed to ensure that they are free of errors, B) analyzed to determine which connection they are associated with, and C) analyzed to determine where, within a stream of data, they belong. Until recently, these steps had to be performed by the host protocol stack. With the introduction of the intelligent network interface device (as disclosed in U.S. patent application Ser. Nos. 09/464,283, 09/439,603, 09/067,544, and U.S. Provisional Application Ser. No. 60/061,809), these steps may now be performed before the packets are delivered to the host protocol stack.

Even with such steps accomplished by an intelligent network interface device, there is another problem to be addressed to reduce or eliminate data copying, and that is obtaining the address of the destination in memory and passing that address to the network interface device. Obtaining this address is often difficult because many network applications are written in such a way that they will not provide the address of the final destination until notified that data for the connection has arrived (with the use of the "select( )" routine, for example). Other attempts to obtain this address involve the modification of existing applications. One such example is the Internet Engineering Task Force (IETF) Remote DMA (RDMA) proposal, which requires that existing protocols such as NFS, CIFS, and HTTP be modified to include addressing information in the protocol headers. A solution is desired that does not require the modification of existing applications or protocols.

SUMMARY

A multi-packet message (for example, a session layer message) is to be received onto a Network Interface device (NI device) and the data payload of the message is to be placed into application memory in a host computer. The NI device receives the first packet of the message and passes a first part of this first packet to the operating system on the host. In one embodiment, the first part of the first packet includes the session layer header of the message. The operating system passes this first part of the first packet to an application program. The application program uses the first part of the first packet to identify an address of a destination in application memory where the entire data payload is to be placed. The application program returns the address to the operating system and the operating system in turn forwards the address to the NI device. The NI device then uses the address to place the data portions of the various packets of the multi-packet message into the destination in application memory. In one embodiment, the NI device DMAs the data portions of the packets from the NI device directly into the destination. In some embodiments, the NI device DMAs only data into the destination such that the destination contains the data payload in one contiguous block without any session layer header information, without any transport layer header information, and without any network layer header information.

In some embodiments, the NI device is an interface card that is coupled to the host computer via a parallel bus (for example, the PCI bus). In other embodiments, the NI device is integrated into the host computer. For example, the NI device may be part of communication processing device (CPD) that is integrated into the host computer.

Other structures and methods are described in the detailed description below. This summary does not purport to define the invention. The invention is defined by the claims.

DETAILED DESCRIPTION

Figure 1:
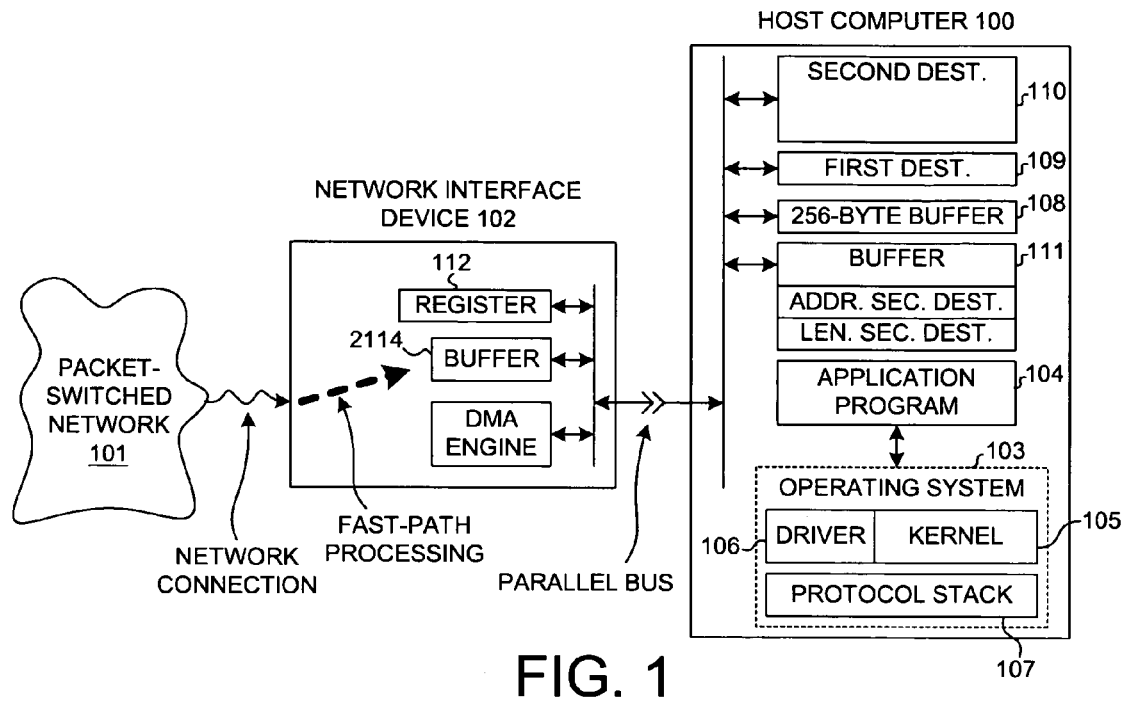
FIG. 1 is a diagram of a Network Interface Device (NI device) in accordance with an embodiment of the present invention. The NI device performs fast-path processing on information passing from a packet-switched network (for example, the Internet), through the NI device, and to a host computer.

FIG. 1 is a diagram of a host computer 100 that is coupled to a packet-switched network 101 (for example, the Internet) via a Network Interface (NI) device 102. In the illustrated example, host computer 100 is an Intel x86-based system (for example, Compaq Proliant). Software executing on host computer 100 includes: 1) a Linux operating system 103, and 2) an application program 104 by the name of "Samba". Operating system 103 includes a kernel 105. Kernel 105 includes: 1) driver software 106 for interfacing to and controlling NI device 102, and 2) a protocol stack 107. A part of protocol stack 107 is specially customized to support the NI device 102.

In one specific embodiment, NI device 102 is the Intelligent Network Interface Card (INIC) of FIGS. 21 and 22 of U.S. patent application Ser. No. 09/464,283 (the entire disclosure of Ser. No. 09/464,283 is incorporated herein by reference). The NI device 102 in this specific embodiment is an expansion card that plugs into a card edge connector on the host computer (for example, a personal computer). The card includes an application specific integrated circuit (ASIC) (for example, see ASIC 400 of FIG. 21 of U.S. application Ser. No. 09/464,283) designed by Alacritech, Inc. of 234 East Gish Road, San Jose, Calif. 95112. The card performs "fast-path processing" in hardware as explained in U.S. application Ser. No. 09/464,283. An INIC card (Model Number 2000-100001 called the "Alacritech 100×2 Dual-Server Adapter") is available from Alacritech, Inc. of 234 East Gish Road, San Jose, Calif. 95112.

Figure 2:
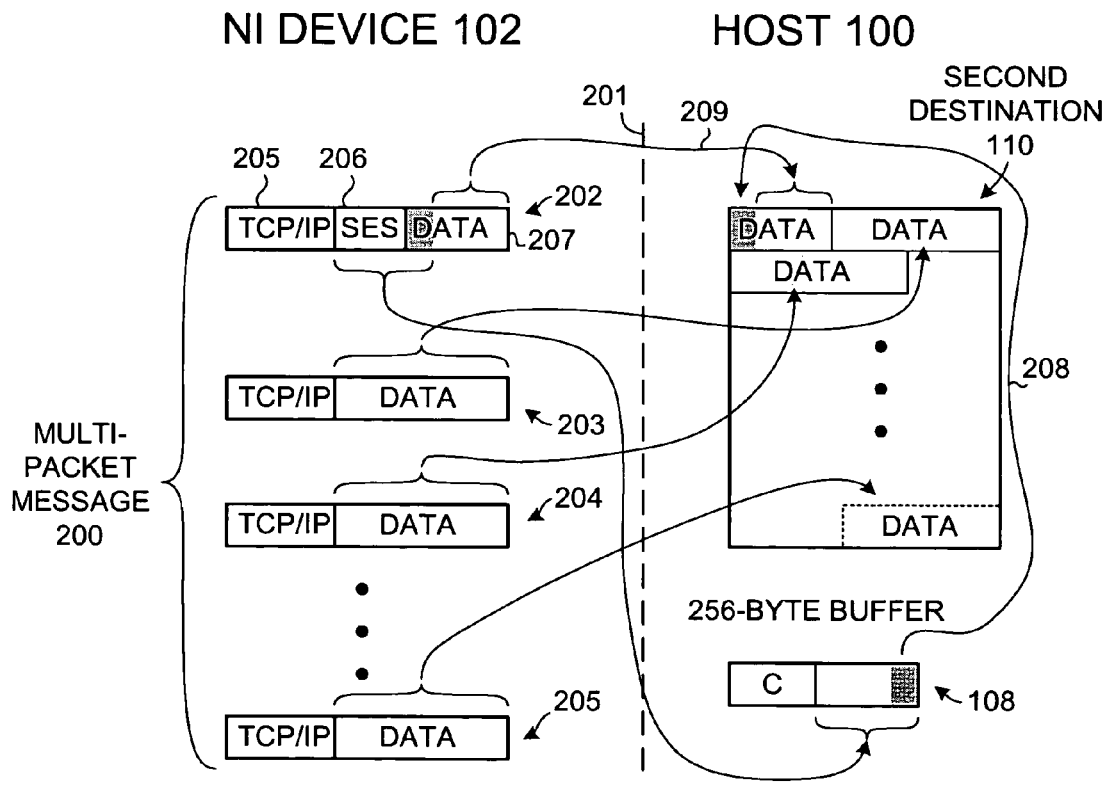
FIG. 2 is a diagram that illustrates a method in accordance with an embodiment of the present invention where network data from a multi-packet session message is transferred by the NI device directly into a destination in a host computer.

FIG. 2 is a diagram illustrating the transfer of data in a multi-packet session layer message 200 from a buffer 2114 (see FIG. 1) in NI device 102 to a second destination 110 in memory in host computer 100. The portion of the diagram to the left of the dashed line 201 (see FIG. 2) represents NI device 102, whereas the portion of the diagram to the right of the dashed line 201 represents host computer 100. Multi-packet message 200 includes approximately forty-five packets, four of which (202-205) are labeled on FIG. 2. The first packet 202 includes a portion 205 containing transport and network layer headers (for example, TCP and IP headers), a portion 206 containing a session layer header, and a portion 207 containing data. The subsequent packets 203-205 do not contain session layer header information, but rather include a first portion containing transport and network layer headers (for example, TCP and IP headers), and a second portion containing data.

Figure 3:
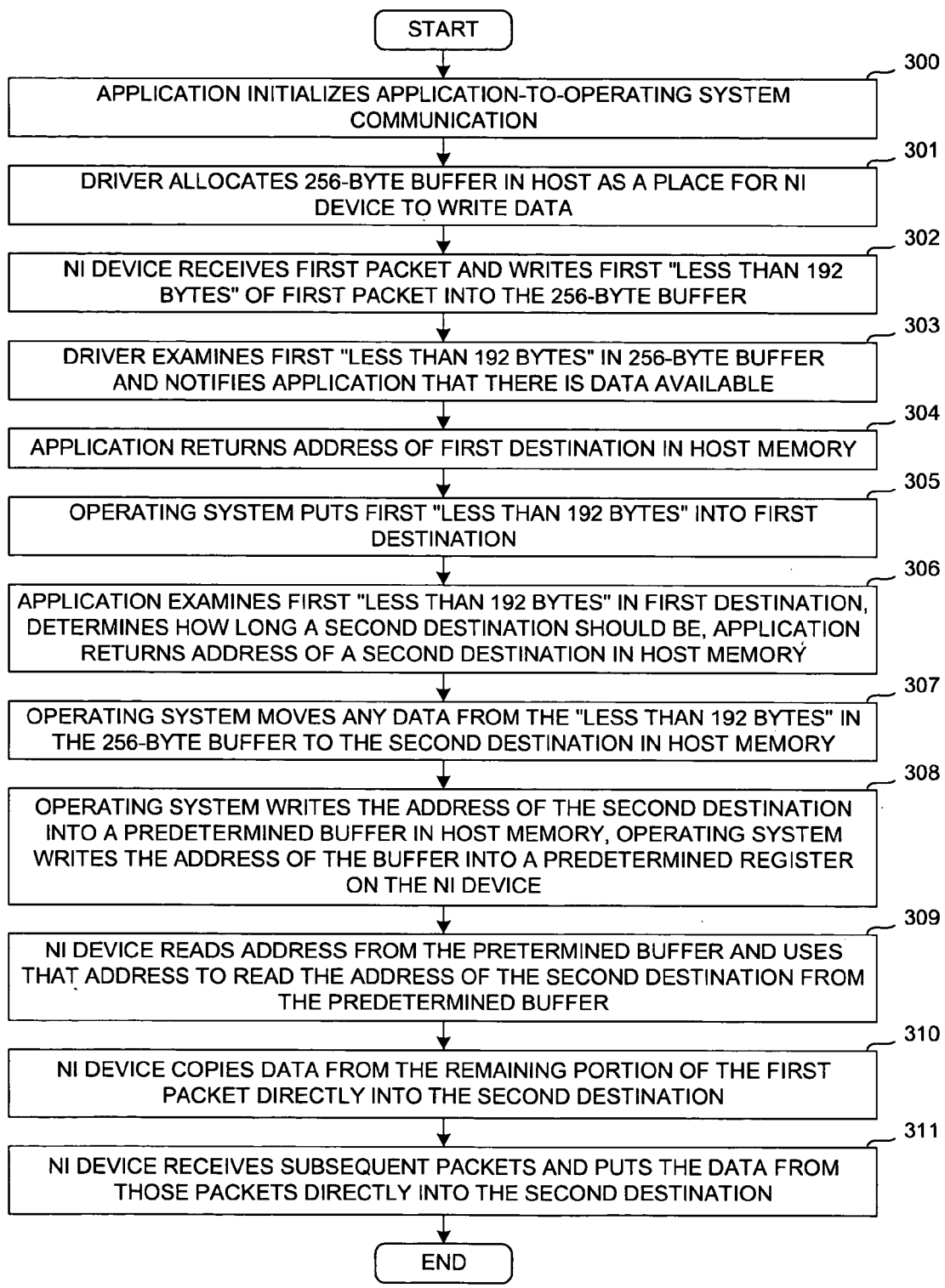
FIG. 3 is a flowchart of a method in accordance with an embodiment of the present invention.

FIG. 3 is a flowchart of a method in accordance with one specific embodiment of the present invention. In a first step (step 300), the Samba application program 104 initializes application-to-operating system communication by calling the "socket" function. The socket function causes kernel 105 to allocate a communication control block (CCB) that will be used to manage the connection. The Samba application program 104 then uses the "bind" routine to associate the socket with a particular local IP adderss and IP port. The Samba application program 104 then calls the "listen" routine to wait for an incoming connection to arrive from kernel 105. When an incoming connection arrives, the Samba application program 104 calls the "accept" routine to complete the connection setup. After setting up the socket, the Samba application program 104 uses the "select" routine to tell the kernel 105 to alert application 104 when data for that particular connection has arrived.

In a next step (step 301), driver 106 allocates a 256-byte buffer 108 in host memory as a place where NI device 102 can write data. Driver 106 then passes the address of 256-byte buffer 108 to NI device 102 so that NI device 102 can then use that address to write information into 256-byte buffer 108. Driver 106 does this by writing the address of 256-byte buffer 108 into a register 112 on the NI device 102. A status field at the top of the 256-byte buffer 108 contains information indicating whether the 256-byte buffer contains data (and is valid) or not.

In step (step 302), NI device 102 receives the first packet 202 of message 200 (see FIG. 2) from network 101. NI device 102 looks at the IP source address, IP destination address, TCP source port and TCP destination port and from those four values determines the connection identified with the packet. (IP is the network layer. TCP is the transport layer.) NI device 102 then: 1) writes a unique identifier that identifies the connection into a designated field in the 256-byte buffer 108; 2) writes the first 192 bytes of the first packet into the 256-byte buffer (the MAC, IP and TCP headers are not written to the 256-byte buffer); 3) sets the status field of 256-byte buffer 108 to indicate that the 256-byte buffer is full; and 4) interrupts the kernel 105.

In a next step (step 303), kernel 105 responds by having the driver 106 look at the status field of the 256-byte buffer 108. If the status field indicates 256-byte buffer 108 is full and valid, then driver 106 passes the address of 256-byte buffer 108 to protocol stack 107. The first part of this 192 bytes is session layer header information, whereas the remainder of the 192 bytes is session layer data. Protocol stack 107 notifies application program 104 that there is data for the application program. Protocol stack 107 does this by making a call to the "remove_wait_queue" routine.

In a next step (step 304), the Samba application program 104 responds by returning the address of a first destination 109 in host memory. The Samba application program 104 does this by calling a socket routine called "recv". The "recv" socket routine has several parameters: 1) a connection identifier that identifies the connection the first destination 109 will be for, 2) an address of the first destination 109 where the data will be put, and 3) the length of the first destination 109. (In some embodiments, Samba application program 104 calls "recv" to request less than 192 bytes.) Through this "recv" socket routine, kernel 105 receives from application program 104 the address of the first destination 109 and the length of the first destination 109. Kernel 105 then gives the address of the first destination 109 to the protocol stack 107.

In a next step (step 305), the protocol stack 107 moves the requested bytes in 256-byte buffer 108 to first destination 109 identified by the address. The first destination is in memory space of the application program 104 so that application program 104 can examine the requested bytes. If the application program 104 requested less than 192 bytes using "recv", then driver 106 moves that subset of the 192 bytes to first destination 109 leaving the remainder of the 192 bytes in the 256-byte buffer. On the other hand, if the application program 104 requested all 192 bytes using "recv", then driver 106 moves the full 192 bytes to first destination 109.

In a next step (step 306), the application examines the requested bytes in first destination 109. Application program 104 analyzes the session layer header portion, determines the amount of session layer data coming in the session layer message, and determines how long a second destination 110 should be so as to contain all the remaining session layer data of message 200. Application program 104 then returns to kernel 105 the address of second destination 110 and the length of the second destination 110. Application program 104 does this by calling the socket routine "recv". Kernel 105 receives the address of second destination 110 and the length of the second destination 110 and gives that information to the protocol stack 107.

In a next step (step 307), the protocol stack 107 moves any session layer data in the 192 bytes (not session layer headers) in 256-byte buffer 108 to second destination 110 identified by the second address. This move of data is shown in FIG. 2 by arrow 208.

In a next step (step 308), the protocol stack 107 writes the address of second destination 110 and the length of second destination 110 into a predetermined buffer 111 in host memory. Driver 106 then writes the address of predetermined buffer 111 to a predetermined register 112 in NI device 102.

In a next step (step 309), NI device 102 reads the predetermined register 112 and retrieves the address of predetermined buffer 111. Using this address, NI device 102 reads the predetermined buffer 111 by DMA and retrieves the address of second destination 110 and the length of second destination 110.

In some embodiments, the second destination 110 is actually made up of a plurality of locations having different addresses of different lengths. The application program supplies a single virtual address for the NI device 102 to read (such as explained in step 310), but this virtual address is made up of many different physical pages. Driver 106 determines the addresses of the pages that are associated with this virtual address and passes these physical addresses and their lengths to NI device 102 by placing the addresses in predetermined buffer 111 and writing the address of predetermined buffer 111 to predetermined register 112 in NI device 102.

In a next step (step 310), NI device 102 transfers the data from the remaining portion of first packet 202 (without any session layer headers, and without any TCP or IP headers) directly into second destination 110 using DMA. In this example, the transfer is made across a parallel data bus (for example, across a PCI bus by which the NI device 102 is coupled to the host computer 100). This move of data is shown in FIG. 2 by arrow 209.

In a next step (step 311), subsequent packets are received onto NI device 102. For each packet, NI device 102 removes the TCP and IP headers and writes the remaining data (without session layer headers, TCP headers, or IP headers) directly to second destination 110 using DMA (for example, NI device 102 may write the data directly into the second destination across the PCI bus by which the NI device 102 is coupled to the host computer 100). The data from the many packets of the session layer message is written into second destination 110 such that there are no session layer headers, transport layer headers, or network layer headers between the data portions from the various packets of message 200.

In the above described specific embodiment, there is no session layer header, transport layer header, or network layer header between the data portions from the various packets of message 200 as the data portions are desposited into the second destination 110. This need not be the case, however. In some embodiments, session layer header information does appear in second destination 110. This is so because it is the application program that determines the length of the second destination 110.

In some embodiments, application program 104 returns a first destination that is larger than 192 bytes. In that case, there is no different second destination. The entire 192 bytes contained in the 256-byte buffer is moved to the first destination. The address of the remainder is given to the NI device as described above with respect to the second destination.

Figure 4:
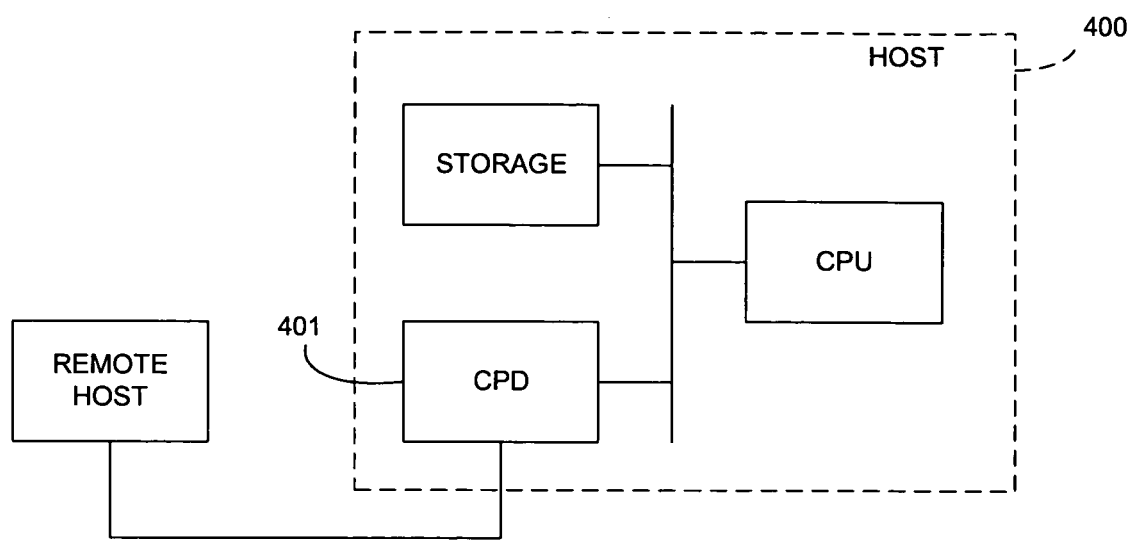
FIG. 4 shows an NI device integrated into a host computer.

Although the NI device may be realized on an expansion card and interfaced to the host computer via a bus such as the PCI bus, the NI device can also be integrated into the host computer. For example, the NI device in some embodiments is disposed on the motherboard of the host computer and is substantially directly coupled to the host CPU. The NI device may, for example, be integrated into a memory controller integrated circuit or input/output integrated circuit that is coupled directly to the local bus of the host CPU. The NI device may be integrated into the Intel 82815 Graphics and Memory Controller Hub, the Intel 440BX chipset, or the Apollo VT8501 MVP4 Northbridge chip. FIG. 4 shows an NI device integrated into a host computer 400 in the form of a communication processing device (CPD) 401.

Although the present invention is described in connection with certain specific embodiments for instructional purposes, the present invention is not limited thereto. Advantages of the present invention may be realized wherein either no header information or just an insubstantial amount of header information is transferred from the network interface device into the second destination. All the data from the session layer message may be deposited into a single contiguous block of host memory (referred to as a destination) in some embodiments or may be deposited into several associated blocks (that together are referred to as a destination) of host memory in other embodiments. Accordingly, various modifications, adaptations, and combinations of various features of the described embodiments can be practiced without departing from the scope of the invention as set forth in the claims.

What is claimed is:

1. A method for use by a network interface for a host computer running an application, the method comprising:
    running, on the network interface, a TCP connection for the application;
    receiving, by the network interface, multi-packet message including a first packet and a plurality of subsequent packets, each of the plurality of subsequent packets containing a TCP header portion, an IP header portion and a data portion;
    passing, by the network interface, at least a portion of the first packet of the multi-packet message to the host computer;
    receiving, by the network interface, an indication of a destination in memory on the host computer, the destination controlled by the application; and
    writing, by the network interface, the data portions of the subsequent packets into the destination without writing any TCP header portion into the destination and without writing any IP header portion into the destination.

2. The method of claim 1, wherein the multi-packet message has a data payload, and writing the data portions of the subsequent packets into the destination includes writing the entire data payload by the network interface into the destination.

3. The method of claim 1, wherein the network interface is an intelligent network interface card (INIC) that includes a DMA engine, and writing the data portions of the subsequent packets into the destination includes writing the data portions by DMA.

4. The method of claim 1, further comprising storing the address of the destination with the TCP connection on the network interface.

5. A method comprising:
   receiving, by a network interface device for a host computer, a message containing a plurality of packets having a TCP header and a data portion;
   passing at least a portion of a first of the packets from the network interface device to the host computer, wherein said at least a portion includes a session layer header;
   receiving, by the network interface device, an indication of a destination in host memory, in response to the passing at least a portion of the first packet to the host computer; and
   transferring, by the network interface device, the data portions of any of the plurality of packets subsequent to the first packet into the destination without writing any TCP header portion of any of the subsequent packets into the destination.

6. The method of claim 5, wherein the network interface device comprises an expansion card and an application specific integrated circuit (ASIC).

7. The method of claim 5, wherein only a portion of the first packet is passed to the host computer when passing at least a portion of the first packet to the host computer, such that the host computer generates the indication of the destination without receiving the entire first packet.

8. The method of claim 5, wherein the host computer includes a motherboard, and wherein the network interface device is disposed on the motherboard.

9. A method comprising:
   receiving, by a network interface device for a host computer, a message containing a first packet and a plurality of subsequent packets having a TCP header portion and a data portion, the TCP header portion indicating an application in the host computer;
   passing a first part of the first packet, but not a second part of the first packet, from the network interface device to the host computer, the first part of the first packet including a session layer header portion;
   receiving, by the network interface device from the host computer, an indication of a destination in host memory provided by the application; and
   transferring, by the network interface device, the data portions of the subsequent packets into the destination without writing any TCP header portion of any of the subsequent packets into the destination.

10. The method of claim 9, further comprising:
    transferring, by the network interface device, the second part of the first packet from the network interface device and into the destination.

11. The method of claim 9, wherein the indication of the destination in host memory comprises a plurality of addresses and a plurality of lengths.

12. The method of claim 9, wherein the message is communicated over a TCP/IP connection, and wherein the TCP/IP connection is setup before passing the first part of the first packet from the network interface device to the host computer.

13. The method of claim 9, wherein the application determines from the session layer header how much session layer data is contained in the message, and wherein the application determines how big the destination should be in order to contain all the session layer data of the message, and wherein all the session layer data is written into the destination such that no TCP headers are present in the destination and such that no IP headers are present in the destination.

14. The method of claim 13, wherein all the session layer data is written into the destination and such that no session layer headers are present in the destination.

* * * * *